June 5, 1962     H. L. NAIMER     3,038,054
DEVICE FOR SEALING ELECTRICAL SWITCHES AGAINST SPLASH
WATER AND THE LIKE
Filed Aug. 4, 1959
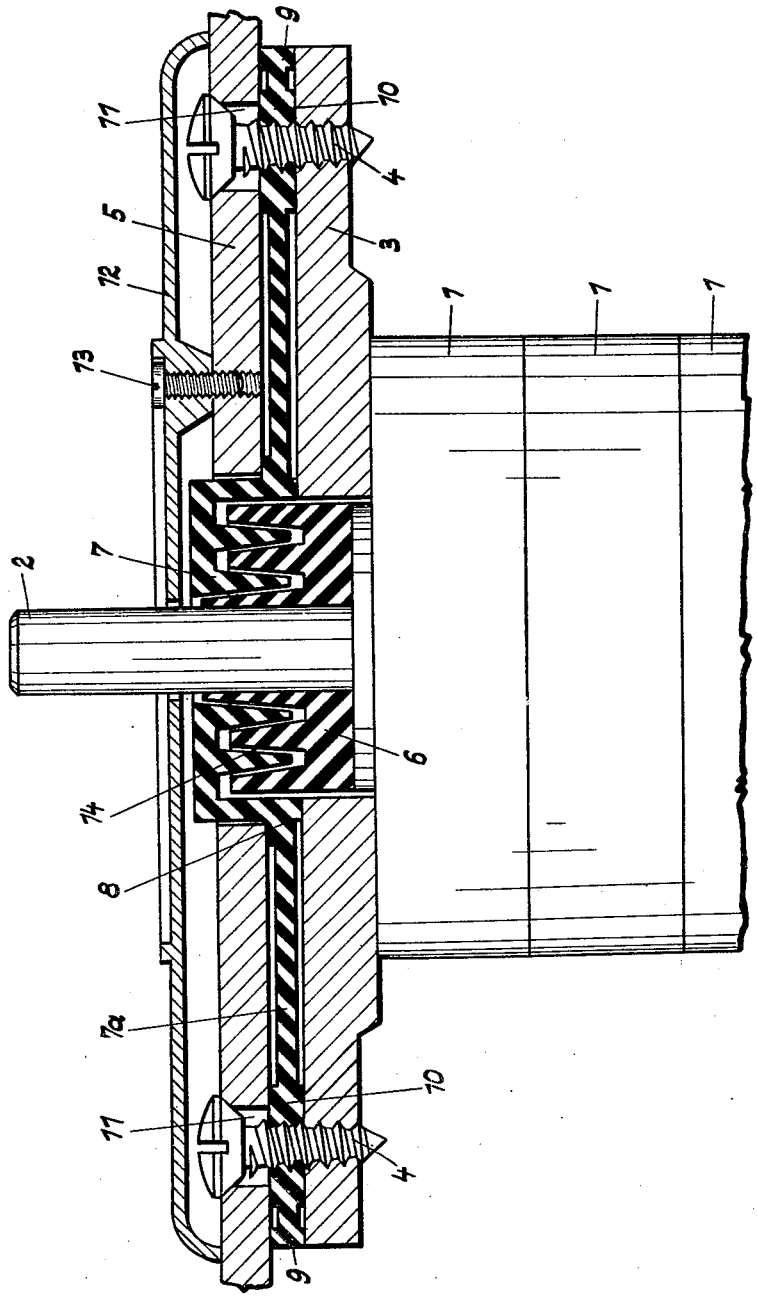
Inventor
   HUBERT LAURENZ NAIMER
by
      Kurt Kelman
        AGENT 3,038,054
DEVICE FOR SEALING ELECTRICAL SWITCHES
AGAINST SPLASH WATER AND THE LIKE
Hubert L. Naimer, Schumanngasse 35, Vienna, Austria
Filed Aug. 4, 1959, Ser. No. 831,540
Claims priority, application Austria, Aug. 18, 1958
4 Claims. (Cl. 200—168)

The present invention relates to a device for sealing electrical switches mounted on a carrying wall against splash water as well as humid air, explosive gases and the like. This carrying wall may consist of a control panel, the wall of a box accommodating the switch, a part of a column of a machine tool or another wall-like element of construction. The present sealing device is characterized in that a switch shaft end portion protruding outwardly through the carrying wall has tightly mounted thereon a labyrinth member, which cooperates with a mating labyrinth member having a sealing peripheral rim which is forced against the carrying wall.

The use of the present device is particularly recommendable in a switch which is mounted on a mounting plate which is in turn connected to the carrying wall. In this case the mating labyrinth member is designed according to the invention to have a configuration conforming to that of the mounting plate so that this mating member forms an intermediate wall member which provides additional sealing areas adjacent to retaining screws which connect the mounting plate and the carrying wall.

An illustrative embodiment of the lastmentioned sealing device is shown in the accompanying diagrammatic sectional drawing, which serves also to explain further features of the invention.

The drawing shows component rotary switches 1, which are combined in a manner known per se on an actuating shaft 2 to form a multiple switch. This multiple switch is affixed to a mounting plate 3 in a known manner, which is not significant in the present connection, and the mounting plate 3 is retained on a carrying wall 5 by screws 4. So far the arrangement is entirely conventional. There is now the problem to prevent a penetration of splash water or the like behind the wall 5 in order to prevent its penetration between the switch shaft and switch housing into the interior of the latter.

For this purpose the switch shaft 2 carries a labyrinth member 6, which consists suitably of moderately elastic plastic. This member is tightly mounted on the shaft to rotate therewith. A mating labyrinth member 7 has a peripheral projection 8, which is clamped between the mounting plate 3 and the carrying wall 5 by means of the screws 4 or other screws, which may be provided. The shaft 2 passes through an opening in the central portion of the labyrinth member 7. This represents the simplest embodiment of the sealing device according to the invention, which may be further developed as follows:

The mating labyrinth member 7 is radially continued by a plate 7a the configuration of which conforms preferably to that of the mounting plate. In practice it will mostly be of square configuration. The peripheral edges of this plate 7a are formed with enlargements 9, which provide an additional seal spaced from the labyrinth member. A seal of the screw holes in which the screws 4 extend through the plate 7a may be provided in a simple manner by using screws having a self-tapping thread so that the screws work themselves prefectly tightly into the plates 7a and 3, the latter of which may also consist of a moderately elastic plastic. The plate 7a is formed with additional sealing rings 10 adjacent to the retaining screws 4 to prevent a penetration of water rearwardly through oversize holes 11. The drawing shows also a front plate 12, which is affixed with three fixing screws 13 to the carrying wall 5.

For a further improvement of the seal the spaces 14 between the labyrinth ribs may be filled with grease.

It is essential for the present sealing device that the labyrinth member 6 is tightly mounted on the switch shaft 2. For this reason these parts must have identical inside and outside profiles, respectively. It is not difficult, however, to fulfil this requirement in practice.

What I claim is:

1. A rotary switch arrangement, comprising in combination a supporting wall formed with an opening therein, said opening having an axis; a stationary switch member having a face portion in abutting engagement with said wall about said opening; a first labyrinth member having a labyrinth portion axially aligned with said opening and a mounting portion radially extending from said labyrinth portion, said mounting portion being sealingly interposed between said wall and said face portion about said opening; fastening means for fastening said face portion and said mounting portion to said wall in abutting engagement with each other and with said wall; actuating shaft means rotatable about said axis on said switch member and projecting through said opening; and a second labyrinth member mounted on said shaft means and having a labyrinth portion in mating engagement with the labyrinth portion of said first labyrinth member, the matingly engaged labyrinth portions having each a plurality of projections and recesses of coaxially circular cross section about said axis, the projections of one labyrinth portion mating the recesses of the other labyrinth portion.

2. A switch arrangement as set forth in claim 1, wherein said mounting portion has an enlarged sealing rim in simultaneous sealing engagement with said wall and said face portion along a continuous line about said opening.

4. A switch arrangement as set forth in claim 1, said labyrinth portion and said mounting portion of said first labyrinth member being integrally formed of resiliently yieldable material.

4. A wall-mounting switch arrangement, comprising, in combination, a rotary switch having an axis and a stationary face portion extending transversely of said axis; a first labyrinth member having an annular peripheral portion spaced from said axis and mounted on said face portion, and a central portion adjacent said axis and spaced from said face portion, said central portion being formed with an opening therein; actuating shaft means rotatable on said switch about said axis and outwardly projecting from said face portion thereof through said opening in said first labyrinth member; a second labyrinth member sealingly fastened to said shaft means intermediate said central portion and said face portion, at least a portion of said second labyrinth member and said central portion of said first labyrinth member each having a plurality of annular projections and recesses coaxial with respect to said axis, each projection on said members matingly engaging a recess on the other member; and means for sealingly securing said first labyrinth member to a wall formed with an opening when said shaft means engages the opening of the wall, whereby said labyrinth members form a seal over the opening in the wall.

References Cited in the file of this patent
UNITED STATES PATENTS

| | | |
|---|---|---|
| 1,908,804 | Wiberg | May 16, 1933 |
| 2,159,766 | Larracq | May 23, 1939 |
| 2,680,368 | McKitrich | June 8, 1954 |
| 2,750,214 | Bermingham | June 12, 1956 |
| 2,766,022 | Bender | Oct. 9, 1956 |
| 2,942,088 | Mullen et al. | June 21, 1960 |

FOREIGN PATENTS

| | | |
|---|---|---|
| 53,664 | Switzerland | Nov. 14, 1910 |
| 676,351 | Germany | June 2, 1939 |
| 689,964 | Germany | Apr. 10, 1940 |